Oct. 6, 1931.  E. H. BOSTOCK  1,825,850
MINE CAR
Original Filed Nov. 25, 1929   3 Sheets-Sheet 1
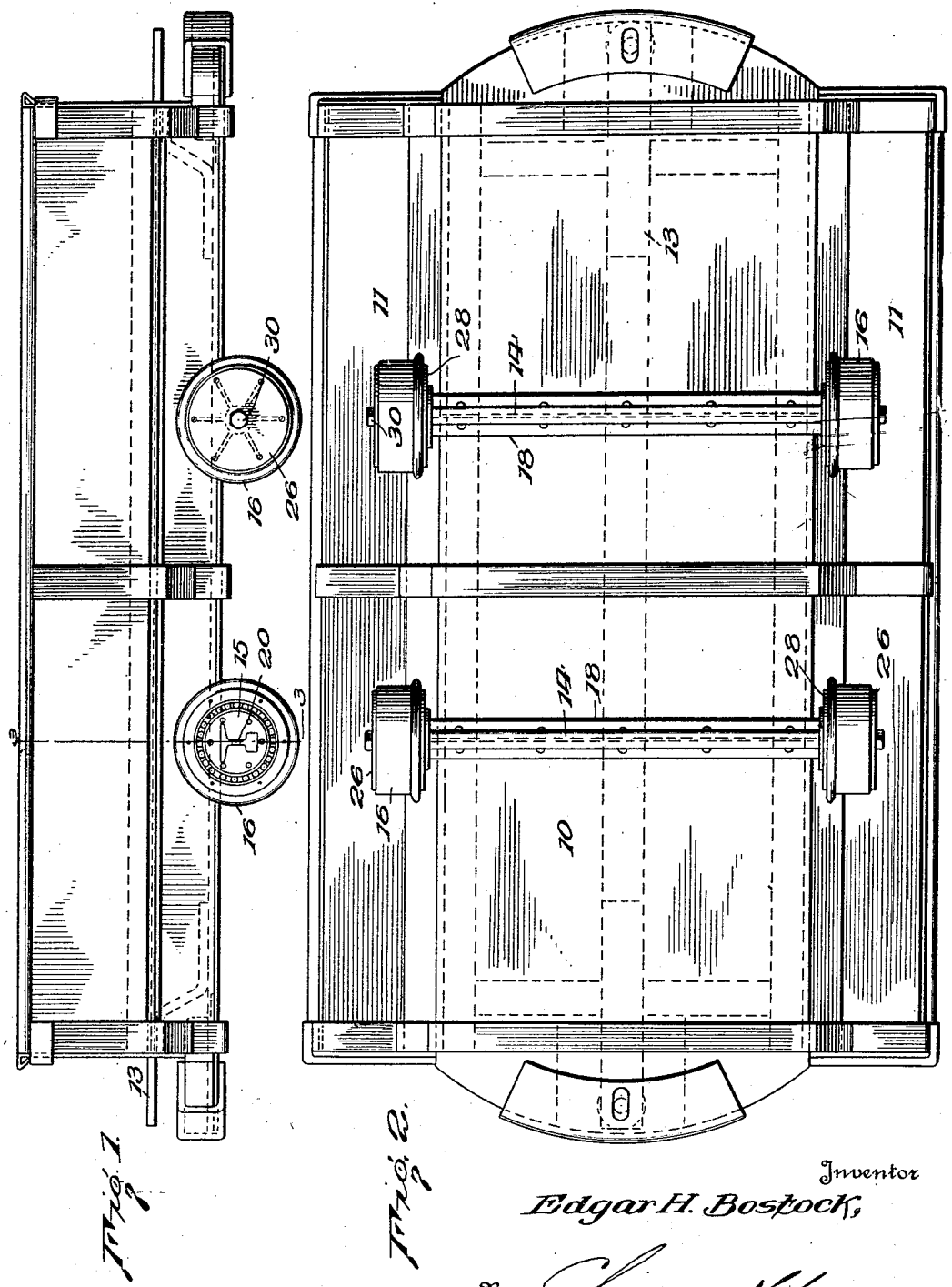
Inventor
Edgar H. Bostock,
By
His Attorneys

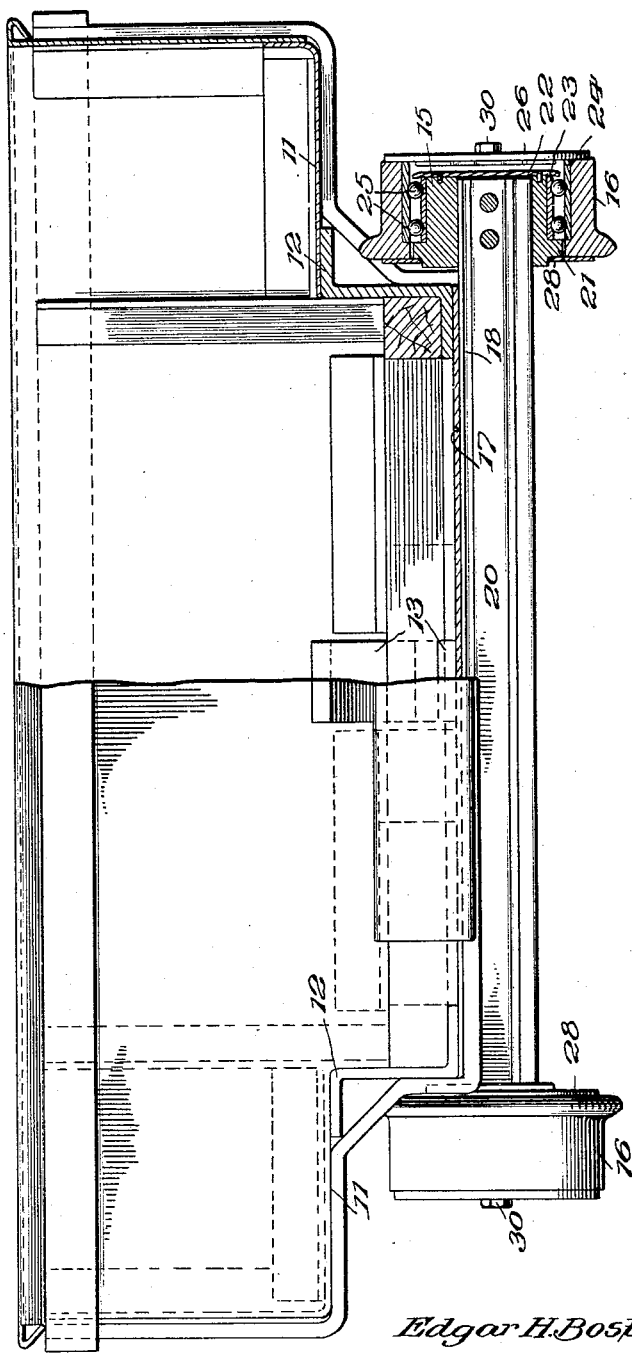

Oct. 6, 1931.  E. H. BOSTOCK  1,825,850
MINE CAR
Original Filed Nov. 25, 1929  3 Sheets-Sheet 3
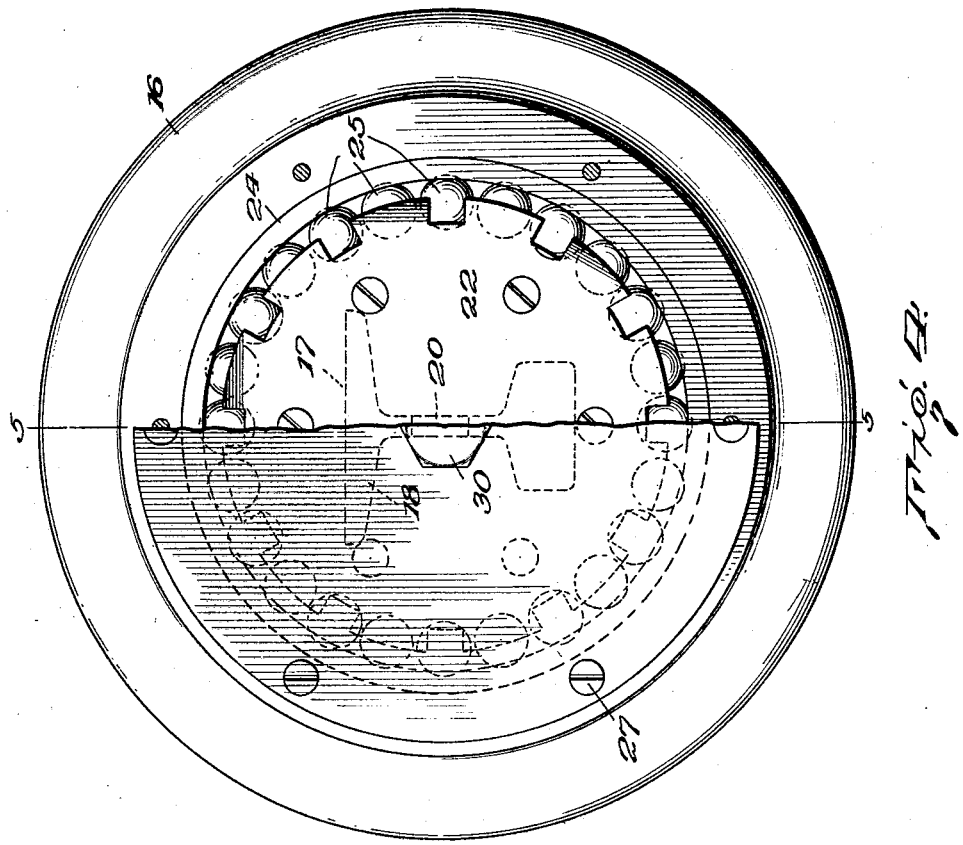
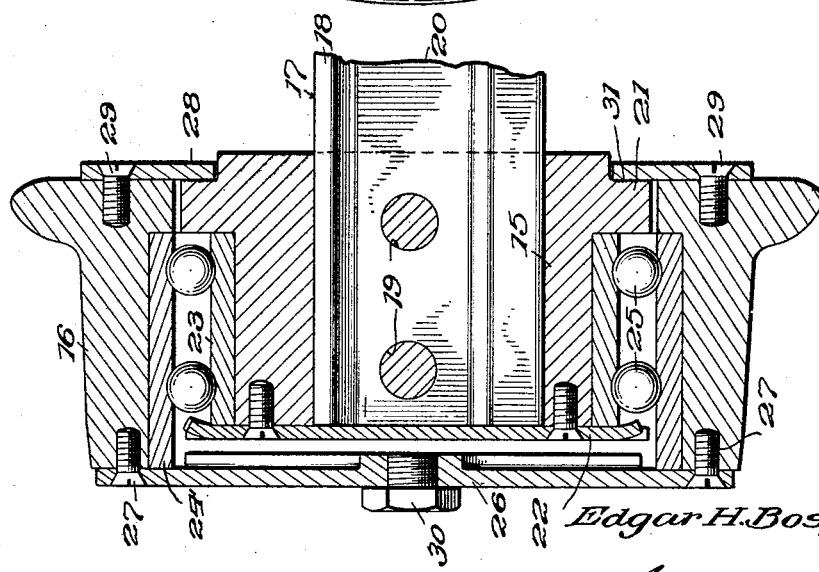
Inventor
Edgar H. Bostock,
By
His Attorneys Patented Oct. 6, 1931

1,825,850

UNITED STATES PATENT OFFICE

EDGAR H. BOSTOCK, OF NUTLEY, NEW JERSEY

MINE CAR

Original application filed November 25, 1929, Serial No. 409,685. Divided and this application filed October 1, 1930. Serial No. 485,727.

This invention relates to improvements in industrial cars, such as mine, ore and quarry cars. One object of the invention is to provide a wheel and axle assembly that is essentially adapted for rigid connection directly to the plates constituting the bottom of the car, whereby the trucks, which are constituted solely of the wheels and axle are always in line and any pull on the drawbar must always act on a straight line perpendicular to or at right angles to the axles of the truck assemblies. The rigid connection of the bottom of the car directly to the axles also insures against the loss of tractive power, because there can be no looseness of parts, such as is common in journal boxes and other elements ordinarily used for wheel mountings, that must be taken up in the initial application of tractive power to the car.

In order to lower the bottom of the car as much as possible, and thereby increase the capacity of the car without increasing its over-all height, the hubs of the wheels are preferably fixed directly on the ends of the axles and revolubly mounted on said fixed hubs are the wheel rims. Such a construction renders possible the use of wheels of smaller diameter than are now commonly found in use on industrial cars.

With these and other objects in view the invention consists in certain details of construction and combinations and arrangements of parts all as will hereinafter be more fully described and the novel features thereof particularly pointed out in the appended claims.

In the accompanying drawings,—

Figure 1 is a side elevation of a car embodying the present improvements;

Fig. 2 is a bottom plan view thereof;

Fig. 3 is a vertical sectional view transversely of the car on the line 3—3 of Fig. 1.

Fig. 4 is an enlarged elevation of one of the traction wheels, a portion of the closure plate being removed to better illustrate the interior of the wheel;

Fig. 5 is a vertical sectional view on the line 5—5 of Fig. 4, but showing the axle in elevation.

While the features of the present invention are applicable to various types of industrial cars, they have been illustrated in the present instance in connection with a mine car. As shown more or less in outline, the central portion 10 of the car bottom is located in a plane below the side portions 11, the metal plates constituting these portions of the bottom being mounted on sills 12 extending longitudinally of the car. Also extending longitudinally of the car and centrally thereof is the drawbar 13.

In order that the body of the car, and especially the bottom plates 10, may be lowered as much as possible while leaving sufficient clearance under the car, said central bottom plates 10 are mounted directly on the axles 14 and the axles have cast thereon the hubs 15 for the rotatable rims or tread sections 16 of the wheels. It is, of course, desirable to provide as large a bearing surface as possible on the axles for the car bottom, and, while axles of various cross section can be utilized, it is preferred that the axles be formed of sections of commercial railway rails. Other cross sections, as stated, may be used, it only being essential that the upper surface 17 present as great an area as possible for engagement against the car body. As shown, the body of the car is attached to the axles by rivets or similar fastening members that project through the car bottom and through flanges 18, these flanges constituting the base of the rail. Where these fastening elements register with the drawbar 13 they also extend through that member, so that at these points the drawbar, the bottom plates of the car and the axles are rigidly connected together. In this way, all draft strains are transmitted directly to the axles and wheels, and no tractive power whatever is lost. This would not be true in the usual wheel mounting, because in those structures there is always a certain degree of looseness or play which necessarily increases by wear during usage of the car. Furthermore, the rigidity of the connections between the drawbar, car bottom and axle insures the draft strains being transmitted to the axles in a line perpendicular or at right angles to the axles.

In order that the axles may be located as near the ground as possible commensurate with the clearances required under the car, the wheels are made sectional, as before mentioned, with the hubs 15 cast directly on the ends of the axles. To insure locking the hubs on said axles the latter are provided with recesses into which a portion of the metal constituting the hub may flow. Where rail sections are used for axles, these recesses are preferably in the form of apertures 19 formed in the webs 20 of the rails. The wheel hubs 15 are formed with an annular flange near their inner edge and a raceway 23 is mounted on the periphery of the hub between said flange and a retaining plate 22 secured to the hub. Secured in the tread portion 16 of the wheel is another raceway 24 and interposed between the two raceways are one or more series of antifriction elements, preferably in the form of balls 25. The outer end of the tread section 16 is closed by plate 26 secured on said section by bolts 27, and the opening at the inner end of the tread section is closed by an annular plate 28 held in place by bolts 29, the said plate overlapping the flange 21 on the hub section 15. The space within the tread section is adapted to be filled with lubricant through an opening in plate 26, said opening being provided with a closure plug 30. Escape of the lubricant from this chamber at the rear of the wheel is prevented by plate 28, the surface of flange 21 which said plate overlaps being formed with a plurality of serrations 31 in which lubricant will collect and set or congeal so as to form a seal between said flange and plate. Means are also provided for effecting maximum lubrication of the antifriction elements, but such means have been made the subject of applicant's prior application, Serial No. 409,685, filed November 25, 1929, of which the present case is a division.

What I claim is:

1. In mine cars and the like, the combination of an axle having a comparatively broad bearing surface, a car body having a metal bottom directly mounted on said surface of the axle, wheel hubs cast on the ends of said axles, the upper surface of said ends of the axles being in the same horizontal plane as the body bearing portions of said axles and wheel rims revolubly mounted on said hubs.

2. In a mine car and the like, the combination of an axle having a comparatively broad flat upper surface located entirely in a single horizontal plane, a wheel hub cast directly on said axle, and a wheel tread revoluble on said hub.

3. In a mine car and the like, the combination of an axle having a comparatively broad bearing surface for a car body, said axle having recesses therein, a wheel hub cast directly on said recessed portion of the axle, a portion of the hub material lying in said recesses, and a wheel tread revoluble on said hub.

4. In a mine car and the like, the combination of an axle of a cross section substantially corresponding to that of a railroad rail, the base of said rail being disposed upwardly to form a comparatively broad bearing surface for the car body and the web of said rail having an aperture therein, a hub cast on the end of said rail with a portion of the material constituting said hub extending through said apertures, and a wheel tread revolubly mounted on said hub.

5. In a mine car and the like, the combination of an axle, a hub cast on said axle and having an annular flange at its inner end, a wheel tread journaled on said hub, said tread having a cavity therein for lubricant, a closure for one end of said cavity, and a plate on said tread overlapping the flange on said hub, one of said overlapping surfaces having serrations therein in which lubricant may be retained.

EDGAR. H. BOSTOCK.